Figure 1:
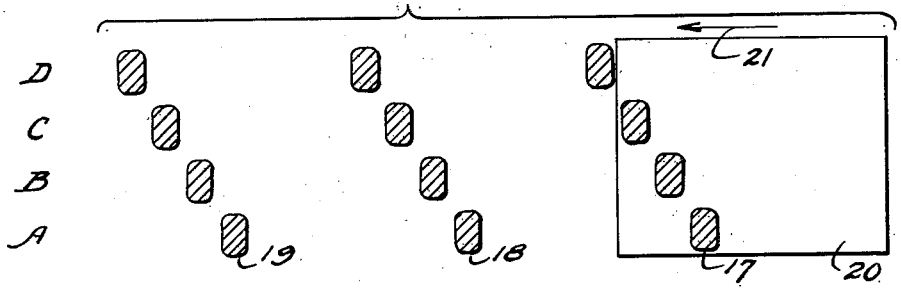

Nov. 29, 1949

R. W. MESSENGER 2,489,583

METHOD OF CUTTING BLANKS FROM
THIN SHEET OR STRIP MATERIAL

Filed Jan. 26, 1948

4 Sheets-Sheet 1

INVENTOR.
Robert W. Messenger
BY *Lancaster, Allwine, & Rommel*
ATTORNEYS.

Nov. 29, 1949    R. W. MESSENGER    2,489,583
METHOD OF CUTTING BLANKS FROM
THIN SHEET OR STRIP MATERIAL
Filed Jan. 26, 1948    4 Sheets-Sheet 2

INVENTOR.
Robert W. Messenger
BY
ATTORNEYS.

Nov. 29, 1949

R. W. MESSENGER 2,489,583

METHOD OF CUTTING BLANKS FROM THIN SHEET OR STRIP MATERIAL

Filed Jan. 26, 1948

4 Sheets—Sheet 3

INVENTOR.
Robert W. Messenger
BY Lancaster, Allwine & Rommel
ATTORNEYS.

Nov. 29, 1949  R. W. MESSENGER  2,489,583
METHOD OF CUTTING BLANKS FROM
THIN SHEET OR STRIP MATERIAL
Filed Jan. 26, 1948  4 Sheets-Sheet 4

INVENTOR.
Robert W. Messenger
BY
ATTORNEYS.

Patented Nov. 29, 1949

2,489,583

UNITED STATES PATENT OFFICE 2,489,583

METHOD OF CUTTING BLANKS FROM THIN SHEET OR STRIP MATERIAL

Robert W. Messenger, Salisbury, Md.; Zilda Minerva Messenger and William Ashley Messenger executors of said Robert W. Messenger, deceased Application January 26, 1948, Serial No. 4,313

14 Claims. (Cl. 164—18)

This invention relates to methods of cutting blanks from thin sheet or strip material, particularly along the general lines set forth in my pending application for means and methods for cutting blanks from thin sheets or strips of metal filed November 7, 1945, Serial No. 627,142.

In accordance with this invention dies are so mounted in line that whether a single row of dies is so mounted or multiple rows of dies in parallel relationship to each other are so mounted, the leading die, in the case of single rows, or the leading die in each row, in the case of multiple rows in parallel relationship to each other, straddles or straddle over one or more potential blank spaces at each feed stroke and make its or their productive cuts in the area of the sheet or strip just beyond the area thus straddled; and the following die in longitudinal relationship to the direction of the feed travel, if double dies in longitudinal line are employed, or the following dies in longitudinal relationship to the direction of the feed travel if more than two dies in each longitudinal line are employed, straddle over the blanked out portion of the sheet or strip which has been worked by the dies preceding it or them, and make their productive cuts in the unworked area of the sheet or strip which has been straddled by the first die, when double dies are employed in longitudinal line, or by all preceding dies, when more than two dies in longitudinal line are employed; and this sequence of die strokes is made until the entire sheet or strip is worked up, in co-ordination with the feed strokes which move the sheet or strip being worked forward a distance equivalent to the longitudinal distance represented by two die cuts plus the necessary threads between the blanks formed by said die cuts, in the case of double dies in line, of three die cuts plus the necessary threads between the blanks formed by said die cuts, in the case of triple dies in line, of four die cuts plus the necessary threads between the blanks formed by said die cuts, in the case of quadruple dies in line, of five die cuts plus the necessary threads between the blanks formed by said die cuts, in the case of quintuple dies in line, and so on up into multiple die mounting of this kind and for this purpose.

Another advantage of the invention wherein the dies are to be mounted is that when two dies are thus mounted in line, or in each row of parallel lines, as above stated, their mounting may be such that the leading die in each row longitudinal of the feed stroke makes two or more die cuts in the straddled space before the following die in the same row makes its first die cut in that row, with that sequence being maintained until the entire sheet or strip is worked. Similarly, that when triple dies in line, quadruple dies in line, quintuple dies in line, or multiple dies above quintuple dies in line are so mounted, their mounting may be such that the leading die in each row longitudinal of the feed stroke makes two or more die cuts in the straddled space before the first following die in the same row longitudinal of the feed stroke makes its first productive cut, and it in turn and if desired also makes two or more die cuts before the next die in line makes its first productive die cut, and so on up.

A further advantage of such arrangement resides in the fact that when dies are so mounted feeding means to move the sheet or strip forward to the next location, stops to prevent the inertia imparted to the sheet or strip by the feeding means from moving said sheet or strip too far, and location means to register the sheet or strip accurately after the feed stroke has been made can be so placed as to function inside of the openings cut into the sheet or strip by the leading dies in making their productive die cuts.

Another advantage of spacing the dies to provide for a plurality of cuts before the next succeeding cut is made so that feeding, stops and registering mechanisms operating in openings cut in the sheet by the leading dies, the space also provides room for blank delivery chutes and by so spacing the succeeding dies of each series such chutes for receiving blanks from each die successively or sets of dies may be positioned immediately following each die or set of dies for receiving and carrying the blanks laterally out from the path of the cutters to a suitable receiver and further feeding, stopping, registering and holding mechanism as may be desired may also be positioned between each of the successive dies or sets of dies and beyond the last cutting die or set of dies in the series.

Other objects and advantages of the invention will appear in the following detailed description, taken in connection with the accompanying drawings, forming a part of this specification and in which drawings:

Figs. 1 to 8 inclusive are diagrammatic views showing the manner in which stock such as tin plate, is fed to dies during the steps taken to cut a plurality of rows of blanks in accordance with the present invention, and Figs. 9 to 16 inclusive are similar diagrammatic views of a modified arrangement for carrying out the process in accordance with this invention.

Referring to the drawings in general the first eight figures of the drawings illustrate the manner in which one process in accordance with this invention is applied in actual practice in the production of oblong can ends, square package ends which have rounded corners, specialty package ends, sardine cans and can ends, meat can ends, and other similar shapes, or shapes which are not round or disc like. As illustrated the process is shown as applied to a plurality of rows with the die of the first row in an advanced position by the amount of a blank end plus the waste thread and each of the succeeding rows in a similar advanced position with respect to the row that follows. The second group of figures, 9 to 16 inclusive, illustrate one manner in which the process can be applied in actual practice in the production of round can ends, of bottle caps, and of any similar discs of any kind. By this arrangement for cutting discs the dies in the successive rows are in staggered relation and the leading die of each row is arranged to make three stampings before the next die, in the row of two dies as shown, produces its stamping. For cutting circular discs the arrangement of the forward dies of each row in staggered relation provides for cutting discs so that they are each a thread distance from six surrounding discs as will be apparent in the central portion of the pattern, thus saving material.

By spacing the forward set of dies so as to make two, three, or more cuts in advance of the cuts of the next die in the row this permits for feeding, registering and other mechanisms operating in the holes in the sheet or strip material produced by the leading die in the row and the next succeeding die in the same row, instead of such arrangement as disclosed in my copending application heretofore referred to.

In accordance with the process as disclosed in Figs. 1 to 8 these diagrams show how the series of sketches numbered 7 to 12 inclusive show how one of the die layouts which employ a method generally of the type covered by my copending application may be used to great advantage in the manufacture of oblong can ends by either gang die production or multiple die production with either separate die or dies mounted in separate presses. Altho triple dies 17, 18 and 19 in line in four rows A, B, C and D longitudinal to the direction of the feed travel are shown it is to be understood that more or less than that number of dies may be more or less similarly mounted without in any way departing from the spirit of this invention. Also, altho production from sheets 20 only four blanks wide and eight blanks long is shown in these figures it is to be understood that sheets any width desired and any length desired may instead be employed, and that up to reasonable widths and reasonable lengths great economy of production will be gained by employing much larger sheets. Also, it is to be further understood that continuous strip can be employed to even greater advantage than sheets with this type of die layout and that quadruple, quintuple and greater multiple dies in line may also be advantageously employed when dies are mounted according to this method.

Fig. 1 of these diagrams shows the first sheet 20 of a stack of sheets as it is fed into position for the first die cut of a series of die cuts. The direction of feed travel is from right to left as indicated by the arrow 21.

Figure 2:
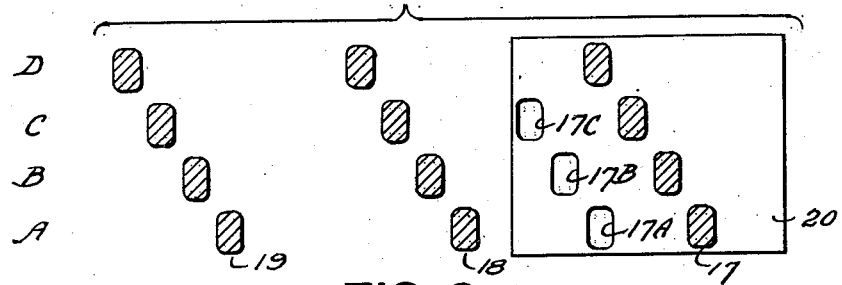

Fig. 2 shows the same sheet 20 properly positioned for the second die cut. The feed has moved it along a distance equivalent to three die cuts plus the width of the necessary threads between the blanks formed by said die cuts. The three blank spaces 17A, 17B and 17C left in the sheet by the first die cut are, in consequence, shown as being three spaces to the left of the present position, with two potential spaces between them and the present position having been straddled and still remaining uncut.

Figure 3:
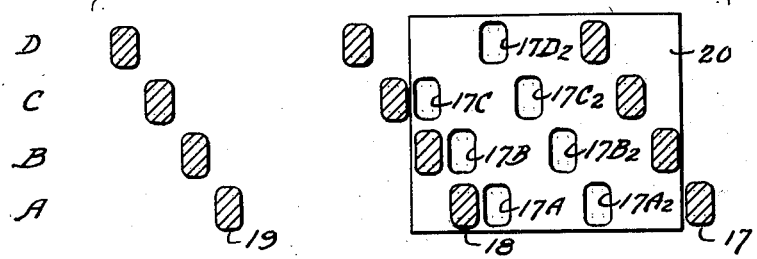

Fig. 3 shows the same sheet 20 advanced to properly position it for the third die cut. The feed has moved it forward again the same distance. The three spaces 17A, 17B and 17C left in the sheet when the first die cut was made are shown as in Fig. 2 and also the four spaces $17A_2$, $17B_2$, $17C_2$ and $17D_2$ left when the second die cut was made are now shown. The first two dies 18 of the second row of dies transversely of the direction of feed travel now make their first die cut and the advantage of the "straddle cut" begins to be plainly apparent.

Figure 4:
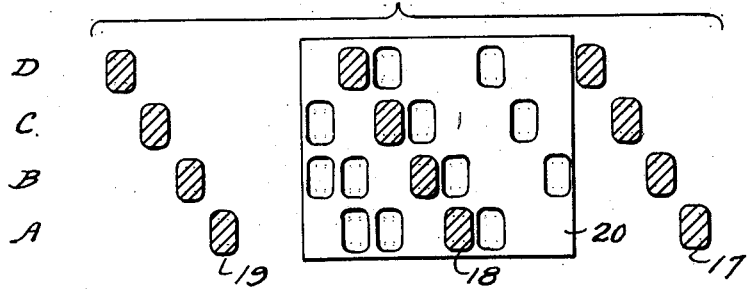

Fig. 4 shows the same sheet 20 properly positioned for the fourth die cut. The feed has moved it forward again the same distance. The spaces left in the sheet when all preceding die cuts were made are clearly shown. All four of the second row of dies 18 which are mounted transversely of the direction of the feed travel will make cuts when the sheet is in this position and all four of the first row of dies which are so mounted are shown as making unproductive cuts. In actual practice, however, when sheets such as sheet 20 are used, the next sheet will follow this one with only one potential blank between its leading edge and the trailing edge of this sheet as shown in Fig. 1. However using strip material the die cutting is continuous without having to provide for such separate sheet feeding.

Figure 5:
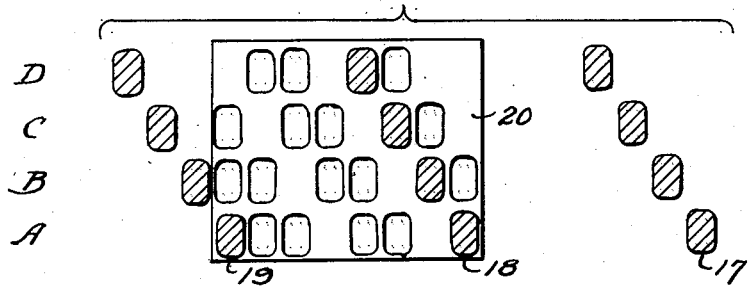

Fig. 5 shows the same sheet 20 similarly positioned for the fifth die cut. It has been moved forward again the same distance. The spaces left in the sheet when all preceding die cuts were made show as before. All four of the second row of dies which are mounted transversely of the direction of the feed travel are shown making cuts and the first die 19 of the third row so mounted has come into action on this sheet for the first time. Altho the first row of dies 17 so mounted is shown making unproductive cuts, in actual practice as referred to above they will all be making productive cuts on the following sheet if sheets are employed, while if continuous strip is employed they will of course be in continuous production.

Figure 6:
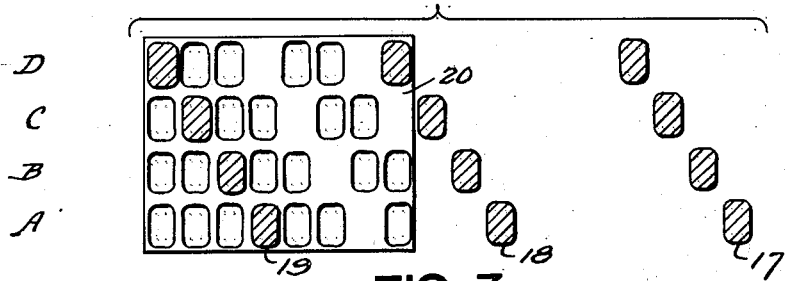
Figure 7:
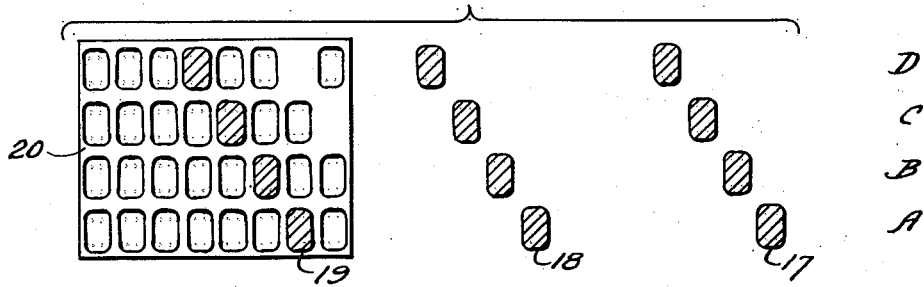
Figure 8:
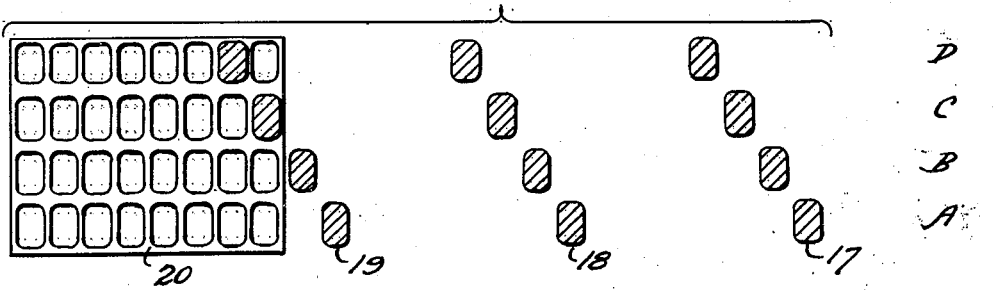

Fig. 6 shows sheet 20 properly positioned for the sixth die cut. It has been moved again the same distance. The position of the last row of dies 19 which are mounted transversely of the direction of the feed travel and spaces left in the sheet by the preceding die cuts clearly show that all remaining potential blanks will be worked by this last row of dies following the next two feed strokes as shown in Figs. 7 and 8. The great conservation of both metal and machine production inherent in this "straddle cut" mounting of dies in relation to the feed movement has now been made clear.

It will be seen that the operation of dies 19 in rows C and D on sheet 20 in Fig. 8 cuts the last potential blanks from this sheet and following this operation by dies 19 sheet 20 may be cut up or otherwise ejected as scrap. In showing the dies and their cuts in these diagrams it is obvious for purpose of illustration, the blank spaces are shown at greater relative distances apart than in practice for the required thread space which is relatively narrow. It is also clear that the process may better be applied to continuous strip material than to sheets 20 having a length of eight potential blank widths with the necessity for feeding the next succeeding sheet a potential blank space behind the end of the sheet 20 passing thru the dies.

Figures 9 to 16 illustrate a modified arrangement of the dies which may be used to great advantage in the manufacture of round can ends by either gang die production or multiple die production with either separate dies or separate rows of dies mounted in separate presses. Altho the method can be well illustrated by employing twelve dies in these diagrams more or less than that number of dies may be more or less similarly mounted without in any way departing from the spirit of this invention. Also, altho production from continuous strip is being shown production from sheets with either scroll cut ends or preferably stagger cut ends such as covered in my Patent No. 2,335,292, can be done to almost as good advantage and should be employed in all cases when sheets must be lithographed before being worked up, as for instance in the manufacture of bottle caps. Altho in this series of diagrams I am showing how the ends of a continuous strip 22 can be handled to advantage it is not necessary or vital to the proper functioning of my method to have the strip enter or leave the lines in any particular manner and altho I am showing double dies 23 and 24 in line in each row longitudinal of the direction of feed travel and showing them straddling three times before the second die in that same row makes its first cut it is to be understood that triple or above triple dies in line may be employed and any distance may be straddled which brings about the proper sequence of operation in accordance with my invention herein.

Figure 9:
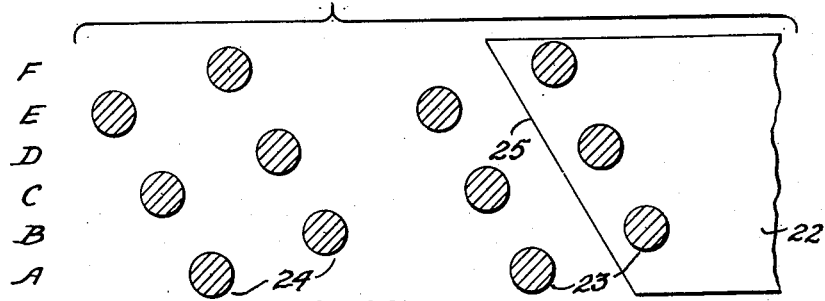

Fig. 9 shows the leading edge of a long and wide coil of continuous strip metal 22 which has been uncoiled, flattened and side trimmed to close accuracy by means well known in the industry, and has had its leading end 25 sheared to an angle corresponding to the angle of the die mounting employed. Altho the diagrams are plan views it is to be understood that press beds are customarily inclined to a high angle and that any angle desired may be employed. The operator first positions the leading end of the strip approximately as shown in Fig. 9 without attempting to reach high accuracy in this positioning for the first cut by the advanced dies 23 in rows B, D and F.

Figure 10:
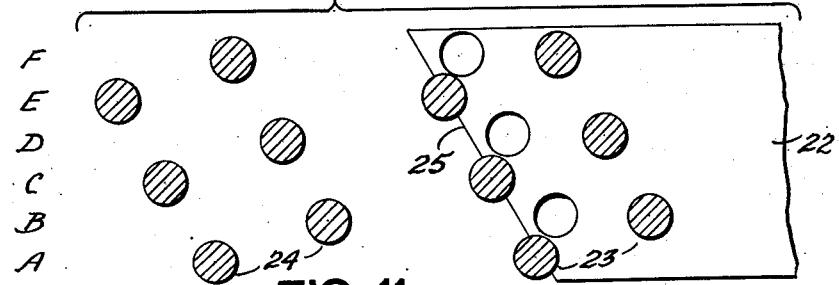

Fig. 10 shows the strip after it has been moved along, from right to left, a distance equivalent to the diameter of two can ends plus the width of the necessary threads between them, and has been located exactly in the new position. While in this position, and with all dies functioning simultaneously, the second row A, C, E of dies 23 cuts out what will be approximately a half can end each, which the operator sends to waste. These half can end cuts are in advance of the first cuts made by the dies with sheet 22 in the position shown in Fig. 9.

Figure 11:
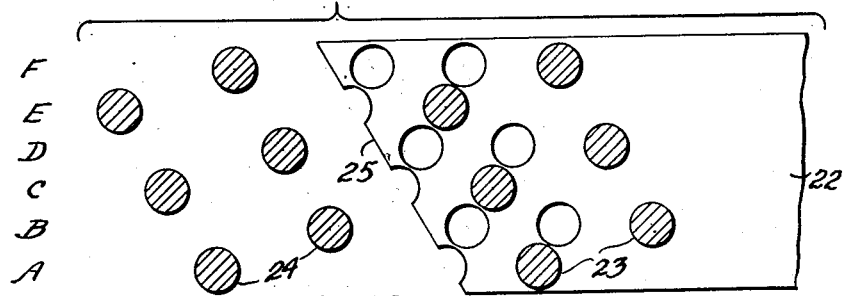
Figure 12:
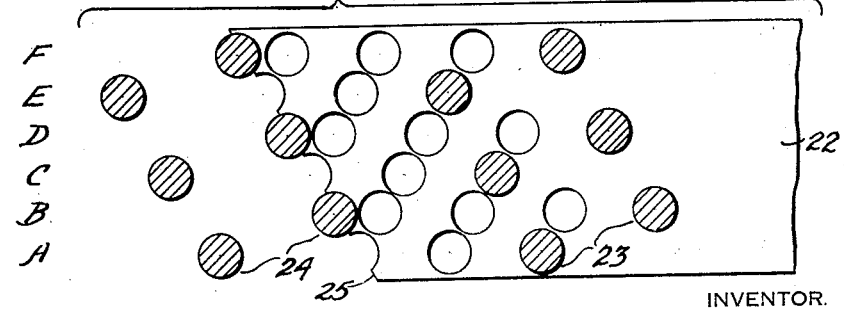
Figure 13:
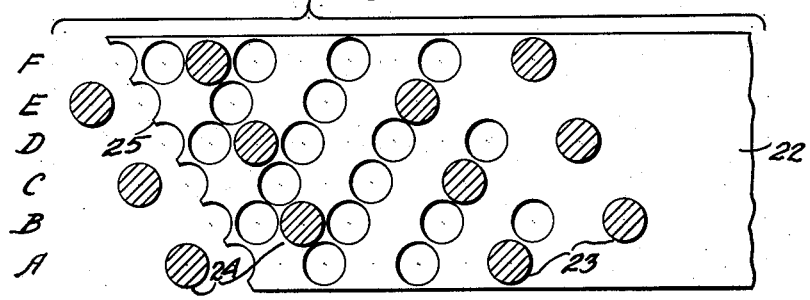
Figure 14:
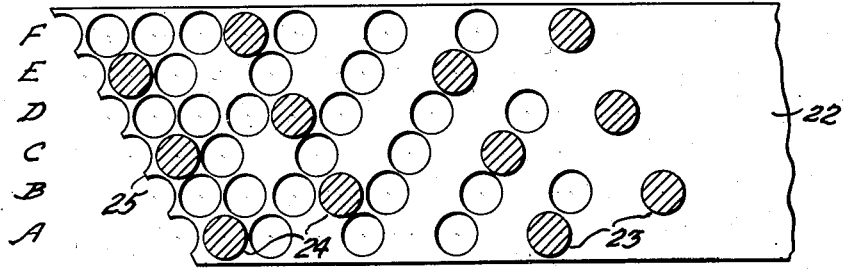

Fig. 11 shows the strip moved along the same distance by another feed stroke, and positioned for the third die cut. Feeding means, locating means and stops may all be employed now inside of the openings made in the sheet by the preceding die cuts.

Fig. 12 shows the strip again moved along the same distance and positioned for the fourth die cut. While in this position the first row of dies 24 cuts out what will be approximately a half can end, which the operator sends to waste. Of course no more waste except what is termed in the industry last waste scrap, will be lost until the entire strip is worked up. This results in a conservation of metal far exceeding any present day practice while at the same time straddle mounting of the dies brings about a rate of output per machine which also far exceeds any present day practice.

Fig. 13 shows the strip again moved along the same distance and positioned for the fifth die cut.

Figure 15:
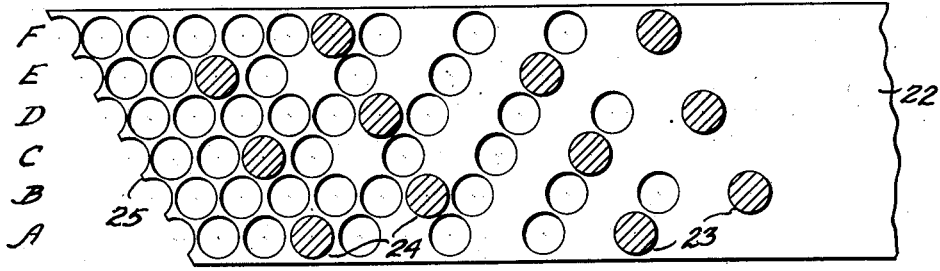
Figure 16:
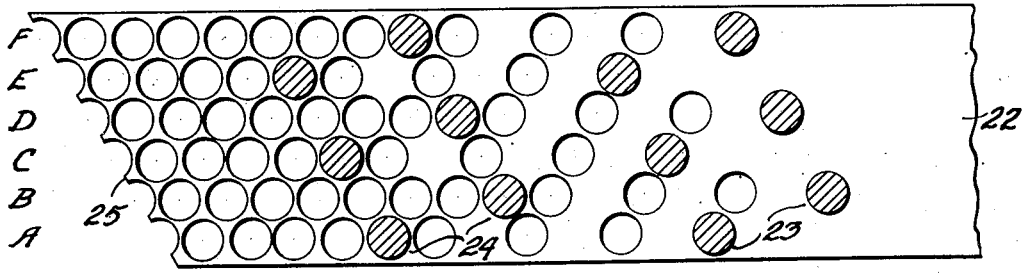

Fig. 14 shows the strip again moved along the same distance and positioned for the sixth die cut and Figs. 15 and 16 show the results of the succeeding two operations illustrating the completely punched portion of the strip as it passes the final row of dies if the strip were to remain extending after such operations. As positioned in Fig. 14 (as well as succeeding positions of the strip) this die cut brings the second row of dies 24 into production for the first time, and from this point until the trailing end of the strip is reached all dies are in full production all of the time. In order that waste at the trailing end of the strip may be minimized that end may be sheared diagonally in the same manner that the leading edge was sheared, and at a point which will insure as little loss from waste as occurred at the leading end. Such shearing at either end is optional, however, is not vital to this invention, and may have any other form of shearing substituted, or another long strip may be welded to this first one if desired.

Waste scrap resulting from this operation may be coiled after all die cuts are made and as they are being made or it may be chopped up into small segments by scrap choppers and carried away by conveyors, in accordance with practice as set forth in my earlier copending application referred to hereinbefore.

It will be seen that in accordance with this arrangement in which the strip cut by the leading die of the row with three blank openings in advance of the second die of two dies in the row and in the arrangement illustrated in the first group of diagrams two such openings are produced in advance of the second die of a row of three dies. By such arrangement it can be plainly seen that if the operator desires to employ either primary feeding means or auxiliary feeding means inside of the openings in the strip which are made by the first dies to make their cuts in rows which are longitudinal of the strip, and/or locating means in said openings, and/or stops in said openings, they may be so located with important added advantages resulting.

By such feeding, stopping and registering mechanisms the strip is prevented from going too far, is brought along just far enough, and is located to high accuracy by registration devices, functioning for the first time inside of the blank spaces in the strip which are now for the first time made available thru the adoption of this method.

I claim:
1. In the method of cutting a plurality of blanks from sheet material providing blank pro- ducing spaces, with a plurality of die cutting elements in alignment having an interval between first and second dies to provide for a plurality of cuts between the first and second dies before the second die makes its first cut, which consists in successively feeding the sheet material by intervals equal to the potential cutting space of the total number of dies in the line in the direction of the alignment of the dies for successive cutting operations by the dies so that a plurality of cuts will be made by the first die before its first cut reaches a point adjacent to the second die whereby as the sheet material advances beyond the first die, die cuts by the succeeding die or dies will be made in the potential spaces between the cuts by said first die.

2. In the method of cutting a plurality of blanks from sheet material providing blank producing spaces, with a plurality of die cutting elements in alignment having an interval between each of the dies, to provide for a plurality of cuts between the first and second dies of the die cutting element before the second die makes its first cut, which consists in successively feeding the sheet material by intervals equal to the potential cutting space of the total number of dies in the line in the direction of the alignment of the dies for successive cutting operations by the dies so that a plurality of cuts will be made by the first die before its first cut reaches a point adjacent to the second die whereby as the sheet material advances beyond the first die, die cuts by the succeeding die or dies will be made in the potential spaces between the cuts made by said first die.

3. In the method of cutting a plurality of blanks from sheet material providing blank producing spaces, with a plurality of die cutting elements in alignment having an interval between first and second dies equal to a multiple of the potential cutting space required for the total number of dies to provide for a plurality of cuts between the first and second dies before the second die makes its first cut, which consists in successively feeding the sheet material by intervals equal to the potential cutting space of the total number of dies in the line in the direction of the alignment of the dies for successive cutting operations by the dies so that a plurality of cuts will be made by the first die before its first cut reaches a point adjacent to the second die whereby as the sheet material advances beyond the first die, die cuts by the succeeding die or dies will be made in the potential spaces between the cuts by said first die.

4. In the method of cutting a plurality of blanks from sheet material providing blank producing spaces, with a plurality of die cutting elements in alignment having an interval between each of the dies equal to a multiple of the potential cutting space required for the total number of dies to provide for a plurality of cuts between the first and second dies of the die cutting element before the second die makes its first cut, which consists in successively feeding the sheet material by intervals equal to the potential cutting space of the total number of dies in the line in the direction of the alignment of the dies for successive cutting operations by the dies so that a plurality of cuts will be made by the first die before its first cut reaches a point adjacent to the second die whereby as the sheet material advances beyond the first die, die cuts by the succeeding die or dies will be made in the potential spaces between the cuts by said first die.

5. In the method of cutting a plurality of blanks from sheet material providing blank producing spaces with a plurality of die cutting elements in alignment having an interval between the first and second dies to provide for a plurality of cuts between the first and second dies before the second die makes its first cut, which consists in feeding the sheet material in the direction of the alignment of the dies for a first cut made by the first die at a space from an edge of the sheet material and thereafter feeding the sheet material by intervals equal to the potential space of the total number of dies in the line so that a plurality of cuts will be made by the first die before its first cut reaches a point adjacent to the second die whereby as the sheet material advances the dies beyond the first die, die cuts by the succeeding die or dies will be made in potential spaces forward of and between cuts by said first die.

6. In the method of cutting a plurality of blanks from sheet material providing blank producing spaces, with a plurality of die cutting elements in alignment having an interval between the first and second dies equal to a multiple of the potential cutting space required for the total number of dies to provide for a plurality of cuts between the first and second dies before the second die makes its first cut, which consists in feeding the sheet material in the direction of the alignment of the dies for a first cut made by the first die at a space from an edge of the sheet material and thereafter feeding the sheet material by intervals equal to the potential space of the total number of dies in the line so that a plurality of cuts will be made by the first die before its first cut reaches a point adjacent to the second die whereby as the sheet material advances the dies beyond the first die, die cuts by the succeeding die or dies will be made in the potential spaces forward of and between cuts by said first die.

7. In the method of cutting a plurality of blanks from sheet material providing blank producing spaces in the material, with two die cutting elements in alignment having an interval between the dies to provide for a plurality of cuts spaced a potential blank space apart between the first and second dies before the second die makes its first cut, which consists in successively feeding the sheet material by equal intervals of two potential cutting spaces in the direction of the alignment of the dies for cutting operations by the dies so that a plurality of cuts will be made by the first die before its first cut reaches a position for a cut by the second die so that as the sheet material advances beyond the first die succeeding die cuts will be made in the potential spaces between the cuts by said first die.

8. In the method of cutting a plurality of blanks from sheet material providing blank producing spaces in side by side relationship in the material with three die cutting elements in alignment having an interval between the dies to provide for a plurality of cuts spaced two potential blank spaces apart between the first and second dies before the second die makes its first cut, which consists in successively feeding the sheet material by equal intervals of three potential cutting spaces in the direction of the alignment of the dies for cutting operations by the dies so that a plurality of cuts will be made by the first die before its first cut reaches positions for cuts by the second and third dies so that as the sheet material advances beyond the first die succeeding die cuts will be made in the potential spaces between the cuts by said first die.

9. The method of cutting can end blanks from sheet material providing a plurality of potential can end producing spaces in side by side relationship in the sheet material, comprising feeding the sheet material, step by step, a distance at each step equal to the distance between the center lines of three potential can end producing spaces, to a pair of simultaneously operating dies spaced apart longitudinally of the path of travel of the sheet material a distance equal to the distance between the center lines of eight potential can end producing spaces.

10. The method of cutting can end blanks from sheet material providing a plurality of potential can end producing spaces in side by side relationship in the sheet material, comprising feeding the sheet material, step by step, a distance at each step equal to the distance between the center lines of three potential can end producing spaces, to three simultaneously operating dies spaced apart longitudinally of the path of travel of the sheet material a distance equal to the distance between the center lines of eight potential can end producing spaces.

11. The method of cutting a plurality of blanks from sheet material as defined in claim 1, wherein the cutting operations are performed by means of multiple rows of cutting dies with the dies of each row in alignment and spaced at intervals as set forth.

12. The method of cutting a plurality of blanks from sheet material as defined in claim 1, wherein the cutting operations are performed by means of multiple rows of cutting dies with the dies of each row in alignment and spaced at intervals as set forth, with the dies in the rows in offset position with respect to the dies in adjacent rows.

13. The method of cutting a plurality of blanks from sheet material as defined in claim 1, wherein the cutting operations are performed by means of multiple rows of cutting dies with the dies of each row in alignment and spaced at intervals as set forth with the dies in the rows diagonally offset crosswise of the direction of feed.

14. The method of cutting a plurality of blanks from sheet material as defined in claim 1, wherein the cutting operations are performed by means of multiple rows of cutting dies with the dies of each row in alignment and spaced at intervals as set forth with the dies in the rows diagonally offset and staggered crosswise of the direction of feed.

ROBERT W. MESSENGER.

No references cited.

Certificate of Correction

Patent No. 2,489,583                                                              November 29, 1949

ROBERT W. MESSENGER

It is hereby certified that error appears in the printed specification of the above numbered patent requiring correction as follows:

Column 7, line 39, for "alements" read *elements*;

and that the said Letters Patent should be read with this correction therein that the same may conform to the record of the case in the Patent Office.

Signed and sealed this 11th day of April, A. D. 1950.

[SEAL]

THOMAS F. MURPHY,
*Assistant Commissioner of Patents.*